US009754202B2

(12) United States Patent
Gudan et al.

(10) Patent No.: US 9,754,202 B2
(45) Date of Patent: *Sep. 5, 2017

(54) LOW POWER RADIO FREQUENCY COMMUNICATION

(71) Applicants: RICOH CO., LTD., Tokyo (JP); DUKE UNIVERSITY, Durham, NC (US)

(72) Inventors: Ken Gudan, Sunnyvale, CA (US); Sergey Chemishkian, Cupertino, CA (US); Jonathan J. Hull, San Carlos, CA (US); Matthew S. Reynolds, Durham, NC (US)

(73) Assignees: RICOH CO., LTD., Tokyo (JP); DUKE UNIVERSITY, Durham, NC (US)

( * ) Notice: Subject to any disclaimer, the term of this patent is extended or adjusted under 35 U.S.C. 154(b) by 136 days.

This patent is subject to a terminal disclaimer.

(21) Appl. No.: 13/786,342

(22) Filed: Mar. 5, 2013

(65) Prior Publication Data

US 2014/0062672 A1  Mar. 6, 2014

Related U.S. Application Data

(62) Division of application No. 13/598,461, filed on Aug. 29, 2012, now Pat. No. 9,245,158.

(Continued)

(51) Int. Cl.
G06K 19/07 (2006.01)

(52) U.S. Cl.
CPC ..... *G06K 19/0723* (2013.01); *G06K 19/0715* (2013.01)

(58) Field of Classification Search
CPC ....................... G06K 19/0715; G06K 19/0716
(Continued)

(56) References Cited

U.S. PATENT DOCUMENTS 3,924,194 A * 12/1975 Cook ............................ 327/317
5,448,242 A * 9/1995 Sharpe et al. ................. 342/42
(Continued)

OTHER PUBLICATIONS

Visser et al., "Ambient RF Energy Scavenging: GSM and WLAN Power Density Measurements", Proceedings of the 38th European Microwave Conference, Amsterdam, the Netherlands, Oct. 2008, pp. 721-724.

(Continued)

*Primary Examiner* — Hai Phan
*Assistant Examiner* — Son M Tang
(74) *Attorney, Agent, or Firm* — Blakely, Sokoloff, Taylor & Zafman LLP

(57) ABSTRACT

A method, system and tag for low power radio frequency communication is described. In one embodiment, the RF tag comprises: an access point coupled to provide access to a network; an RF tag comprising an energy harvesting unit operable to convert incident RF energy to direct current (DC); a storage unit operable to store recovered DC power; a passive wakeup pattern detector operable to generate an interrupt in response to detecting a set of one or more subcarriers; one or more sensors for sensing; a communication mechanism; and a microcontroller coupled to the energy harvesting and storage units, the one or more sensors, and the backscatter communicator, the microcontroller operable to wake up from a sleep state in response to the interrupt and cause the communication mechanism to exchange data wirelessly with another while powered by energy previously harvested and stored by the energy harvesting and storage unit.

20 Claims, 13 Drawing Sheets

Related U.S. Application Data

(60) Provisional application No. 61/620,878, filed on Apr. 5, 2012.

(58) Field of Classification Search
USPC .................................. 340/10.1, 10.33–10.34
See application file for complete search history.

(56) References Cited

U.S. PATENT DOCUMENTS

| | | | |
|---|---|---|---|
| 5,621,412 A * | 4/1997 | Sharpe et al. | 340/10.33 |
| 5,809,142 A * | 9/1998 | Hurta et al. | 705/68 |
| 6,593,845 B1 * | 7/2003 | Friedman et al. | 340/10.33 |
| 6,760,578 B2 * | 7/2004 | Rotzoll | 455/343.2 |
| 7,081,693 B2 | 7/2006 | Hamel et al. | |
| 7,200,132 B2 | 4/2007 | Twitchell, Jr. | |
| 7,215,976 B2 | 5/2007 | Brideglall | |
| 7,394,382 B2 * | 7/2008 | Nitzan et al. | 340/572.8 |
| 7,400,253 B2 | 7/2008 | Cohen | |
| 7,518,532 B2 * | 4/2009 | Tiernay | 340/928 |
| 7,538,658 B2 | 5/2009 | Twitchell, Jr. | |
| 7,539,520 B2 | 5/2009 | Twitchell, Jr. | |
| 7,639,135 B2 * | 12/2009 | Arms et al. | 340/572.1 |
| 7,683,773 B1 | 3/2010 | Goodall et al. | |
| 7,884,723 B2 * | 2/2011 | Jung et al. | 340/572.4 |
| 8,019,316 B2 * | 9/2011 | Huston et al. | 455/343.1 |
| 8,035,335 B2 | 10/2011 | Duron et al. | |
| 8,095,070 B2 | 1/2012 | Twitchell, Jr. | |
| 8,107,446 B2 | 1/2012 | Shoarinejad | |
| 8,674,809 B2 * | 3/2014 | Bares et al. | 340/10.3 |
| 2003/0104848 A1 * | 6/2003 | Brideglall | 455/574 |
| 2004/0077383 A1 * | 4/2004 | Lappetelainen et al. | 455/574 |
| 2005/0237160 A1 * | 10/2005 | Nolan et al. | 340/10.33 |
| 2005/0248438 A1 * | 11/2005 | Hughes et al. | 340/10.4 |
| 2007/0046459 A1 * | 3/2007 | Silverman et al. | 340/539.13 |
| 2007/0176752 A1 | 8/2007 | Mickle et al. | |
| 2008/0068131 A1 * | 3/2008 | Cargonja et al. | 340/10.1 |
| 2009/0231138 A1 | 9/2009 | Lai et al. | |
| 2010/0141389 A1 * | 6/2010 | Hagl et al. | 340/10.1 |
| 2010/0295663 A1 | 11/2010 | Shoarinejad et al. | |
| 2011/0181399 A1 | 7/2011 | Pollack et al. | |
| 2011/0194471 A1 | 8/2011 | Kim et al. | |
| 2012/0032803 A1 * | 2/2012 | Copeland | G08B 13/2431 340/572.1 |
| 2012/0161942 A1 * | 6/2012 | Muellner et al. | 340/10.5 |
| 2012/0286927 A1 * | 11/2012 | Hagl | G07C 9/00309 340/5.61 |
| 2013/0051375 A1 | 2/2013 | Chemishkian et al. | |
| 2013/0265140 A1 | 10/2013 | Gudan et al. | |
| 2014/0062668 A1 | 3/2014 | Gudan et al. | |
| 2014/0062671 A1 | 3/2014 | Gudan et al. | |
| 2014/0062672 A1 * | 3/2014 | Gudan et al. | 340/10.33 |

OTHER PUBLICATIONS

Buettner et al., "Revisiting Smart Dust with RFID Sensor Networks", Seventh ACM Workshop on Hot Topics in Networks (HotNets—VII), Calgary, Alberta, Oct. 2008, 6 pages.

U.S. Appl. No. 13/598,461, Non Final Office Action, mailed Aug. 11, 2014.

U.S. Appl. No. 13/598,461, Final Office Action, mailed Mar. 6, 2015.

U.S. Appl. No. 13/786,334, Non Final Office Action, mailed Dec. 11, 2014.

U.S. Appl. No. 13/786,337, Non Final Office Action, mailed Dec. 2, 2014.

* cited by examiner

LOW POWER RADIO FREQUENCY COMMUNICATION

PRIORITY

This is a divisional of U.S. patent application Ser. No. 13/598,461, filed on Aug. 29, 2012, entitled "Low Power Radio Frequency Communication," which is assigned to the corporate assignee of the present invention and which claims priority to and incorporates by reference the corresponding U.S. provisional patent application No. 61/620,878, titled, "Low Power Radio Frequency Communication," filed on Apr. 5, 2012.

FIELD OF THE INVENTION

Embodiments of the present invention relate to the field of radio-frequency (RF) communication; more particularly, embodiments of the present invention relate to RF tags that perform energy harvesting, collect and process sensor data and communicate data using standard RF communication techniques.

BACKGROUND OF THE INVENTION

Radio Frequency Identification (RFID) tags are becoming increasingly common. RFID tags that include sensing capabilities have emerged as a generally inexpensive and effective means of addressing many wireless sensor applications in both indoor and outdoor sensing applications. Purely passive sensors, such as RFID tags, when actively interrogated by an RF transceiver/reader, receive energy to power themselves up so that they can acquire readings from their attached sensing elements. Generally, RFID tags equipped with one or more sensors require a source of energy to measure and store their acquired information at times other than during active interrogation by a reader. Standard passive (battery-less) RFID tags provide no means of acquiring sensor information unless they are being actively interrogated by a reader.

Next generation sensor networks may be powered by energy harvesting techniques to avoid requiring battery maintenance. Energy harvesting is a process by which energy is derived from external sources (e.g., radio frequency energy, solar power, thermal energy, wind energy, salinity gradients, or kinetic energy), captured and stored.

Energy may be harvested from radio frequency signals propagating wirelessly. With RF harvesting, wireless energy comes from a radio frequency transmitting device that is some distance away from a device that harvests energy from the radio frequency transmission.

One of the more popular forms of RF used today is Wi-Fi (also referred to as IEEE 802.11a/b/g/n etc.) communications. Today, most Wi-Fi communications are in the 2.4 GHz and 5.8 GHz frequency bands and there are many local area networks that are based on Wi-Fi in which access points enable Wi-Fi clients to gain access to networks such as the Internet. Furthermore, the 2.4 GHz and 5.8 GHz bands also support other networking standards, such as Zigbee and Bluetooth, and other proprietary networks, each transmitting energy by communicating in this same frequency band. Additionally there are other frequency bands that support different communication protocols, each of which transmit energy when they are communicating.

SUMMARY OF THE INVENTION

A method, system and tag for low power radio frequency communication is described. In one embodiment, the system comprises: an access point and an RF tag. In one embodiment, the access point is coupled to provide access to a network. In one embodiment, the RF tag comprises an energy harvesting unit operable to convert incident RF energy to direct current (DC); a storage unit operable to store recovered DC power; a passive wakeup pattern detector operable to generate an interrupt in response to detecting a set of one or more subcarriers; one or more sensors for sensing; a communication mechanism; and a microcontroller coupled to the energy harvesting and storage units, the one or more sensors, and the backscatter communicator, the microcontroller operable to wake up from a sleep state in response to the interrupt and cause the communication mechanism to exchange data wirelessly with another while powered by energy previously harvested and stored by the energy harvesting and storage unit.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
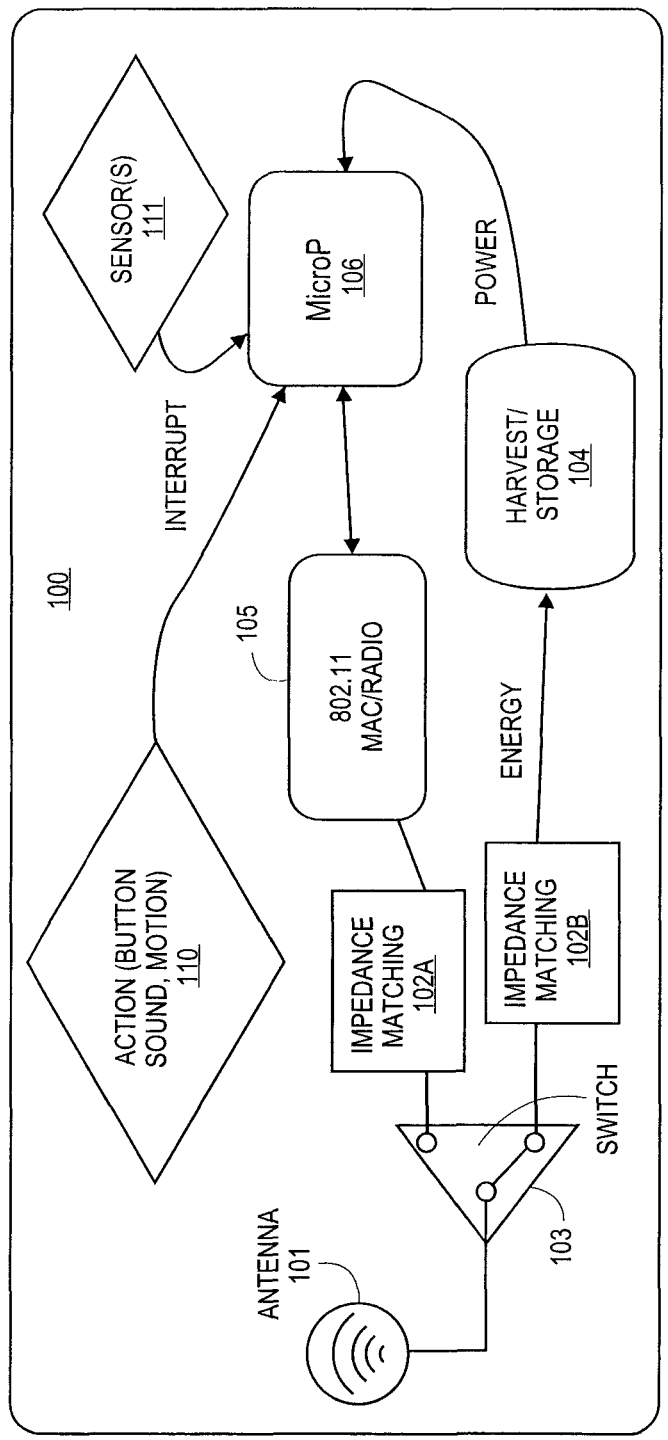
FIG. 1 illustrates one embodiment of a sensor tag that communicates over Wi-Fi.

Embodiments of the present invention include RF tags and wireless communication systems (e.g., Wi-Fi communication systems) that include such tags. Such tags may be part of a sensor network. In one embodiment, the tags perform energy harvesting, collect and process sensor data, and communicate data using standard RF communication techniques (e.g., Wi-Fi).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

A Wi-Fi Communication System

One embodiment of a Wi-Fi wireless communication system is described. In the Wi-Fi communication system, communications occur at 2.4 GHz or 5.8 GHz. Note that in alternative embodiments, communications in the wireless communication system occur at other radio frequencies.

In one embodiment, the Wi-Fi communication system is used as part of an intelligent sensor network having one or more sensor tags. The sensor tags harvest and store RF energy (e.g., Wi-Fi, cellular, etc.), collect and process sensor data, and communicate with other devices (e.g., Wi-Fi devices) using a communication standard (e.g., Wi-Fi, Zigbee, Bluetooth, Bluetooth Low Energy), or even proprietary interfaces. In one embodiment in which the sensor tags communicate via Wi-Fi, the sensor tag communicates with another Wi-Fi device by sending standard UDP packets. In another embodiment in which the sensor tags ultimately communicate via Wi-Fi, the sensor tag communicates using backscatter communication (a backscatter to Wi-Fi bridge is used in this case). Wi-Fi devices perform energy harvesting and storage and utilize a wake-up and command protocol to wake-up, perform sensing and communicate using standard communication (e.g., Wi-Fi, Bluetooth Low-Energy, etc.). In one embodiment, the sensor tag also performs operations (e.g., commands) that may or may not be based on the sensed data.

In one embodiment, the intelligent sensor network includes low-power Wi-Fi sensor tags that use a low-power Wi-Fi state machine to control their operation. FIG. 1 illustrates one embodiment of a sensor tag 100 that communicates over Wi-Fi. Referring to FIG. 1, antenna 101 is coupled to switch 103. The impedance matching circuits 102a and 102b on the outputs of the switch may comprise a passive network of components that improves energy transfer from a source impedance to a load impedance. In one embodiment, impedance matching circuits 102a and 102b are LC circuits. Switch 103 has a terminal coupled to RF radio 105 via impedance matching circuit 102a. In one embodiment, RF radio 105 is an 802.11 Wi-Fi radio, such as a radio from GainSpan of San Jose, Calif. RF radio 105 is coupled to microprocessor 106. Another terminal of switch 103 is also coupled to energy harvesting and storage circuitry 104 via impedance matching circuit 102b. Energy harvesting and storage circuitry 104 is used to provide power to microprocessor 106 and the sensors 111. In one embodiment, energy harvesting and storage circuitry 104 includes an energy harvesting unit and a storage unit. The harvesting circuitry may include a diode based rectifier for converting incoming RF energy to a DC voltage. In some embodiments, the diode based rectifier may include Schottky diodes such as those manufactured by Avago Technologies Inc. The harvesting circuits may also include energy management functions based on discrete implementations known to those familiar with the state of the art, or they could use parts such as the Maxim 17710 or the Linear Technology LTC3108. The storage unit can be a capacitor, super-capacitor, or any type of rechargeable battery technology such as, for example, a Thinergy MEC201. The tag material itself can be a standard printed circuit board, or a flexible tag printed on film such as modern standard RFID tags.

Tag 100 spends most of its time asleep. In order to sense, or communicate, it needs to know when to wake up. This wake up can be at pre-determined intervals pre-configured into microprocessor 106. In one embodiment, tag 100 is awakened prior to its self-wakeup time. In one embodiment, this is caused by use of an external interrupt from interrupt device 110. Interrupt input device 110 and sensors 111 are also coupled to microprocessor 106. In one embodiment, interrupt input device 110 provides an interrupt to microprocessor 106 to wake-up tag 100. The interrupt may be in response to an action. In one embodiment, interrupt input device 110 is a button which provides an interrupt to microprocessor 106 in response to the button being depressed. In another embodiment, interrupt input device 110 comprises a motion sensing device that generates an interrupt to microprocessor 106 in response to motion occurring in proximity to the tag 100. In yet another embodiment, interrupt input device 110 comprises a microphone device that provides an interrupt to microprocessor 106 in response to capturing sound that is audible in proximity to tag 100. In still another embodiment, interrupt input device 110 generates an interrupt periodically or at pre-defined response time-slots to wake-up microprocessor 106 or a self-timer interrupt can be running autonomously on microprocessor 106. Interrupt input device 110 can also be any other type of interrupt-generating device, known to those familiar with the state of the art, other than the example embodiments shown here.

Sensors 111 include one or more sensors that sense data and provide sensed data to microprocessor 106. In one embodiment, sensors 111 comprise one or more temperature, pressure, humidity, gas composition, image, and position sensors. In one embodiment, in response to one of sensors 111 sensing data, the sensor generates an interrupt to microprocessor 106 to wake-up microprocessor 106 so that the sensed data can be stored on the tag (in RAM or ROM internal or external to microprocessor 106), so that it can be uploaded to the network (via wireless communication with another RF device that is proximate to it) at a later time. In one embodiment, these sensors 111 are periodically polled by microprocessor 106 (at a pre-configured polling rate). However, this can be costly from an energy usage perspective. In one embodiment, sensors 111 interrupt microprocessor 106 only when their sense outputs change significantly enough to desire microprocessor 106 to wake up and capture the new condition prior to going back to sleep. Finally, a sensed situation might be significant enough (such as an alarm alert) that one of sensors 111 wakes microprocessor 106 up for a communications event, in addition to a storage event.

Energy harvesting and storage circuitry 104 receives energy via antenna 101 through switch 103 and impedance matching circuit 102b during energy harvesting. Energy harvesting may occur when microprocessor 106 is asleep, and need not occur when microprocessor 106 is communicating. The energy harvested is stored in a energy storage device such as, for example, a capacitor or battery. In one embodiment, when the tag is performing computations or other functions, apart from energy harvesting, harvesting energy and storage circuitry 104 provides power to microprocessor 106.

Figure 2:
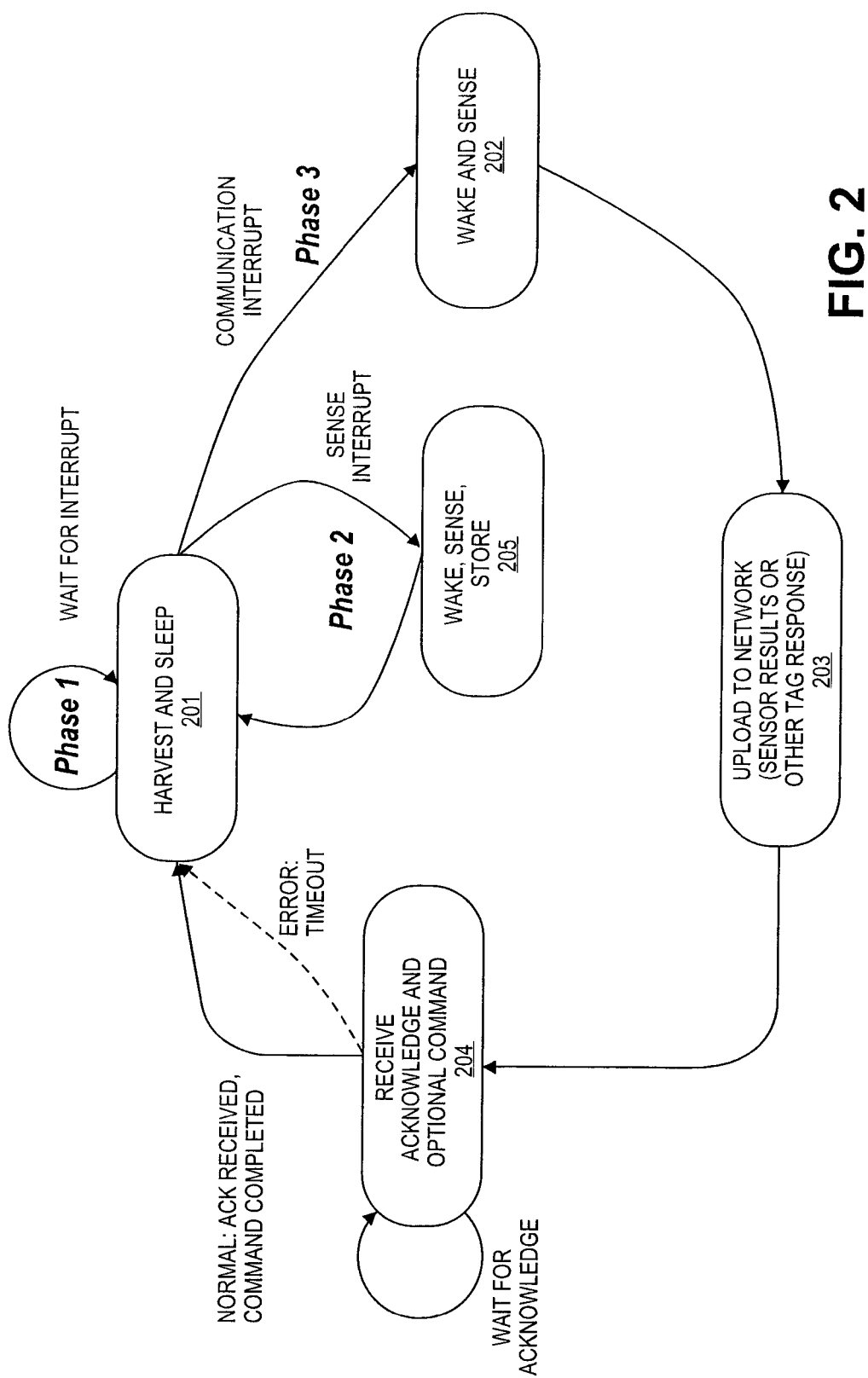
FIG. 2 is a tag state diagram for one embodiment of the Wi-Fi communication tag.

FIG. 2 is a tag state diagram for one embodiment of the tag of the present invention and represents the various states the tag may be in during its use. In one embodiment, the tag state diagram depicts the state of tag 100 of FIG. 1.

Referring to FIG. 2, while in the harvest-and-sleep state 201, the tag performs energy harvesting and storage and is in the sleep state. Thus, the tag does not continually monitor the RF (e.g., Wi-Fi) traffic. The tag remains in state 201 waiting for an interrupt to occur. The interrupt may be an action, event, or the result of data being sensed by one of the tag's sensors.

In response to a sensor interrupt from one or more sensors, the tag transitions into the wake-and-sense-and-store state 205. In one embodiment, in the wake-and-sense-and-store state 205, the tag wakes up, senses the state from one or more of the tag sensors, such as sensors 111 of FIG. 1, and stores the data. Afterwards, the tag transitions to harvest-and-sleep state 201.

In response to an action interrupt (a communication interrupt) such as from an interrupt input device, from a self-timer, or from an alert sensor condition, the tag transitions into the wake-and-sense state 202. In one embodiment, in the wake-and-sense state 202, the tag wakes up and senses the state from one or more of the tag sensors, such as sensors 111 of FIG. 1.

After sensing the state, the tag transitions into the upload state 203 in which the tag uploads (transmits) data to the network. In one embodiment, the data that is being uploaded is sensor results or other tag response data, which may include, but are not restricted to: tag unique identifiers, date/time, tag functional status, configuration and firmware update download status, and tag configuration parameters. The tag may also upload the result of a function computed on the sensor results or other tag response data. For example, a tag that senses temperature may store in a RAM or ROM of the tag a history of recent temperature readings and if a trend is detected that indicates an anomaly, such as a rise (or drop) over time, or an unusual pattern of rises and falls, an alert message can be sent. A tag that captures and processes images can send an alert when an unexpected object is seen, such as, for example, an out-of-place item on an assembly line, an intruder in a secure facility, or that an elderly person has fallen down and cannot get up. The tag may also monitor and store a record of its internal operation. This is useful for monitoring the performance of the tag itself as well as the energy and communication environment that supports the tag. Examples of internal operational information include the number of times the tag's energy storage has been fully charged, the number of times the tag has started harvesting energy, the amount of charge in the energy storage when harvesting started, the number of interrupts received, the number of uploads performed, the number of acknowledgement messages transmitted, etc. If a clock is available, the times when these events occurred could also be recorded. The information about the internal operation of the tag can be uploaded upon receipt of the appropriate command. In one embodiment, the uploading occurs as part of a message packet (e.g., UDP packet).

After uploading to the network has been completed, the tag transitions to the receive-and-acknowledge state 204. While in the receive-and-acknowledge state 204, the tag waits for an acknowledgement. If the acknowledgement is received, the tag transitions back into the harvest-and-sleep state 201 where the tag waits in the sleep state for an interrupt. In one embodiment, if an acknowledgement is not received within a predetermined period of time, and a timeout occurs, the tag transitions from the receive-and-acknowledge state 204 to the harvest-and-sleep state 201, but logs the error condition that can be reported on the next network upload. Note that in one embodiment, the tag may transmit one or more copies of the same data to ensure delivery without waiting for an acknowledge packet.

In one embodiment, while in the receive-and-acknowledge state 204, the tag may receive an optional command packet prior to receiving the acknowledgment packet. In one embodiment, one optional command is a command that provides configuration information to the tag, which sets or changes the tag's configuration upon execution. A non-exhaustive list of tag configuration examples includes: a bitmask of enabled/disabled tag sensors; a vector of sampling rates per sensor; the rate of tag-to-reader communications; a destination URL (or other resource locator) for tag data (the reader routes the data packet to that URL on tag's behalf). In another embodiment, one optional command is a command which, when executed, disables all or a portion of the tag. One example of such a command would be a "kill" command, which permanently renders the tag non-operational. In another embodiment, one optional command is an upgrade message to the tag that initiates a firmware update. The firmware update procedure may involve several commands sent to the tag, with each command carrying a portion of the firmware. In one embodiment, the tag acknowledges each properly decoded command, and continues to wait for the next command from a reader until the tag receives the final acknowledgement packet (which can be but is not limited to a packet with the continuation flag cleared).

In its simplest form, microcontroller 106 has a single code-space and configuration space, defining the operation of the microcontroller every time it wakes up. However, especially in the case of a firmware update, if the update is not properly loaded, the firmware may be incomplete, which may render the microcontroller inoperable, and the tag 100 non-functional. A typical method to overcome this problem is for microcontroller 106 to have two code spaces—one active code space, and one download/update code space. Only when the download/update code space is validated (a CRC checksum is sufficient) does it become the primary operating firmware. Microcontroller 106 can simply switch active with downloaded code spaces by changing program pointers, or by actually copying all the code. Typically, there is a section of "protected" code that can never be changed—this especially includes primary boot-up functionality, as well as fundamental communication and debugging tools. All of these features can be supported by microcontroller 106 on tag 100.

In addition, there may be one, or multiple, configuration spaces in microcontroller 106 on tag 101. The microcontroller can be configured to always use the same configuration option, or it can move through configuration options in a pre-determined manner every time it wakes up. Configuration options may specify different sensing frequencies, sensor types, or different types of sensor data storage depending on the application. Configuration options may also specify different host communication protocols. This way, when the tag uses a different configuration option every time it wakes up, the tag is automatically reconfiguring its own operational state.

Thus, while in the receive-and-acknowledge state 204, the tag may receive a complete firmware update of new active code, and/or new configuration options. Alternatively, especially because the tag may not have sufficient energy to receive this amount of download data, only a subset of this data may be received during one wakeup event. In one embodiment, only a subset of this data is required (such as updating a single configuration option). In any case, the packet sent by the tag in wake-and-sense state 202 can include the status of firmware and configuration updates. In this way, when the tag reaches receive-and-acknowledge state 204, the host can continue the firmware/configuration update from where it left off. After multiple wake-up events, eventually, the complete firmware update will be received by tag 100, and the new active code, and/or configuration options, can be implemented by the tag and microcontroller 106. This is how a tag can reconfigure itself.

In the case where the tag is waiting for an optional command while in the receive-and-acknowledge state 204, and thereafter completes the command, the tag transitions to the harvest-and-sleep state 201.

One Embodiment of a Backscatter Communication System

In one embodiment, the tag is part of a sensor network that uses backscatter for communication. In backscatter communication, a continuous-wave signal from a reader is modulated at the tag by reflecting (or not) data back to the reader. In the case of the present invention, the reader is another wireless device, such as a Wi-Fi access point designed to interrogate a backscatter tag.

Figure 3:
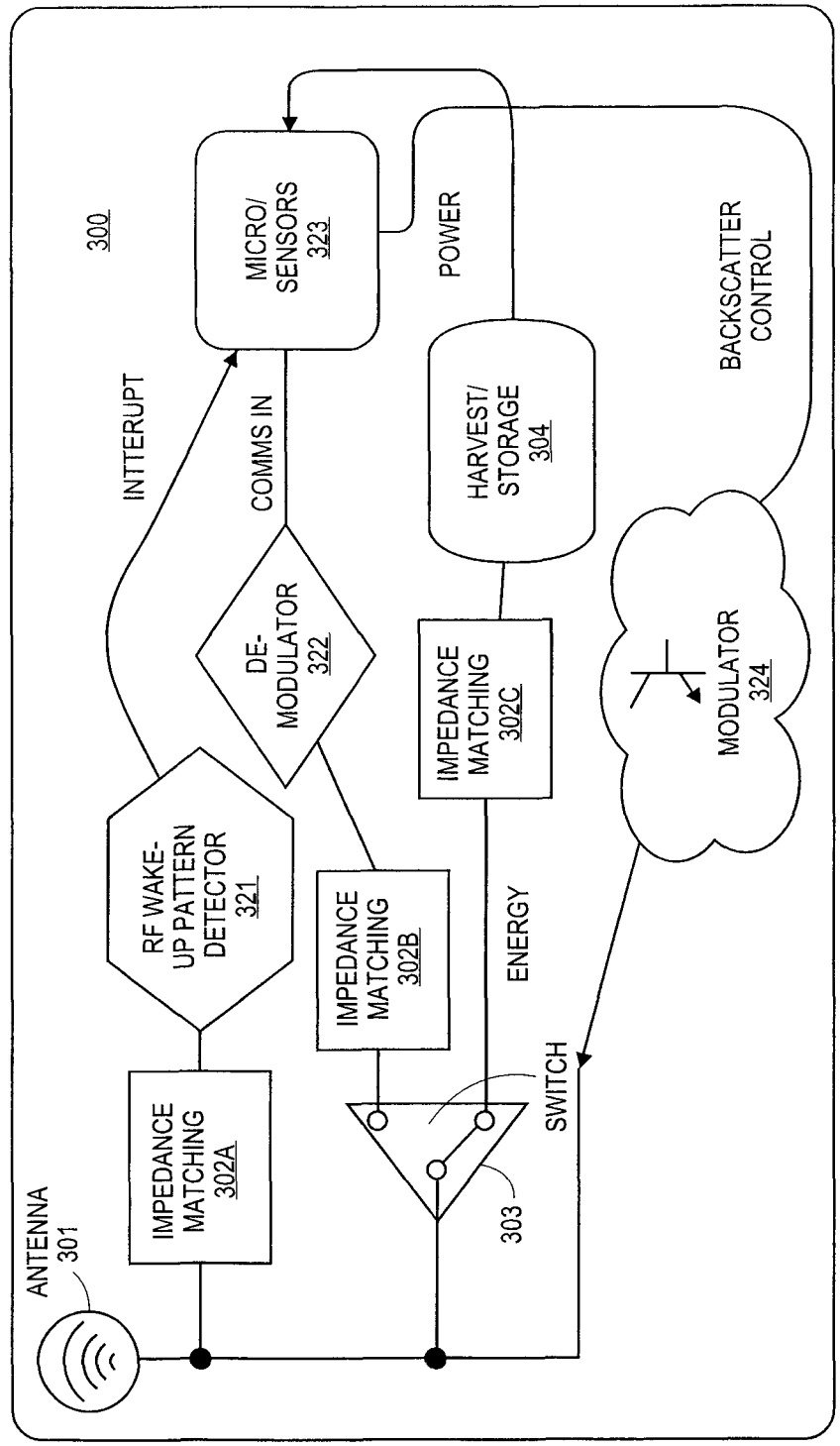
FIG. 3 illustrates one embodiment of a tag that communicates using backscatter.

FIG. 3 illustrates one embodiment of a tag that communicates using backscatter. In one embodiment, the tag communicates using backscatter in the 2.4 GHz frequency band (but backscatter communications are not limited to this frequency).

Referring to FIG. 3, tag 300 includes antenna 301 that receives Wi-Fi (or other RF) communications and is coupled to passive RF pattern detector 321 via impedance matching circuit 302a and switch 303. In one embodiment, the impedance matching circuit 302a comprises an LC circuit.

Backscatter communications, by its nature, requires energy from the reader (e.g., an access point) in order for the tag to communicate. Therefore, the tag needs to "listen" for the incoming RF energy, to be able to backscatter the energy to communicate. As a result, unlike the Wi-Fi tag described above (which is only harvesting when asleep), the backscatter tag actively "listens" for energy, even when it is harvesting. This listening can consume so much power that it is possible there won't be any power left to harvest. Thus, passive RF pattern detector 321 needs to be extremely low power (0-power ideal) so that it can detect when a reader wants to communicate with the tag, but still permit sufficient energy to be harvested. Passive RF pattern detector 321 monitors RF traffic and performs pattern matching on the received communications. The pattern is provided by another RF device near tag 300. In one embodiment, this RF device is an access point (AP) near tag 300 that provides energy for tag 300. If a matching pattern is detected, passive RF pattern detector 321 generates an interrupt to microprocessor/sensor unit 323. In one embodiment, the pattern is a sequence that is unique to the tag. By using the unique sequence, passive RF pattern detector 321 is able to determine when communication (or RF energy) is directed specifically to this tag 300 (and other tags disregard this communication). In one embodiment, passive RF pattern detector 321 comprises a 150 nA microprocessor supervisor IC and a 200 nA comparator from Austria Microsystems. The first acts as a delay element for the incoming energy, while the second acts as a logic AND gate, so that when a delayed pulse matches up with a second energy pulse, the pattern is thus detected. In another embodiment, passive RF pattern detector 321 comprises two ultra-low-power operational amplifiers (such as the OP281 from Analog Devices), configured as a window comparator, designed so that a rectified voltage received from the antenna is confirmed to be between low and high voltage settings, thereby indicating a match between the incoming wave energy and the appropriate duty cycle, so that the incoming energy wave can be detected. The passive RF pattern detectors described above are time-based detectors. In addition, an embodiment of a frequency-based RF pattern detector will be described in more detail later in this description.

In response to an interrupt from passive RF pattern detector 321, microcontroller 323 wakes up and performs one or more operations as described herein. In one embodiment, microcontroller 323 may be implemented with a microprocessor. In one embodiment, microcontroller 323 wakes up in response to sensor input, pattern detector, or pre-set timer.

Switch 303 is coupled to demodulator 322 via impedance matching circuit 302b and energy harvesting and storage unit 304 via impedance matching circuit 302c. During operation, switch 303 also receives RF communications received by antenna 301. While energy harvesting, the RF energy received through switch 303 from antenna 301 is stored in energy harvesting and storage circuitry 304. When no longer harvesting energy (for example the energy storage may be full, or a wake-up event has been detected), and performing and operating in the awake state, energy harvesting and storage circuitry 304 provides power to microprocessor and sensors 323.

When no longer harvesting energy (as described above), communications received from antenna 301 received through switch 303 are also demodulated by demodulator 322 and the demodulated communications are provided to microcontroller 323.

In one embodiment, tag 300 includes a backscatter modulator 324 that is coupled to microcontroller 323 and also coupled to antenna 301. Microcontroller 323 provides backscatter control to backscatter modulator 324 to provide a different modulation back to antenna 301 to communicate with another Wi-Fi device (via a backscatter communication bridge) in its proximity. In the case of most basic modulation, the ASK (amplitude shift keying), modulator 324 can be as simple as a transistor connecting a switchable impedance (which may include one of a short circuit, a resistance, a capacitive reactance, or an inductive reactance) from the antenna 301 to ground, or leaving it disconnected in response to a command from microcontroller 323. Modulator 324 may be more sophisticated if a different modulation mode is required, like PSK or QAM. When modulator 324 connects the antenna to ground directly (in case of ASK modulation) or via circuit(s) with reactive components (e.g., a RC-circuit (PSK or QAM modulation), a part of incident RF energy received by antenna 301 is reflected back to the reader and can be recovered and detected by the receiver.

Figure 4:
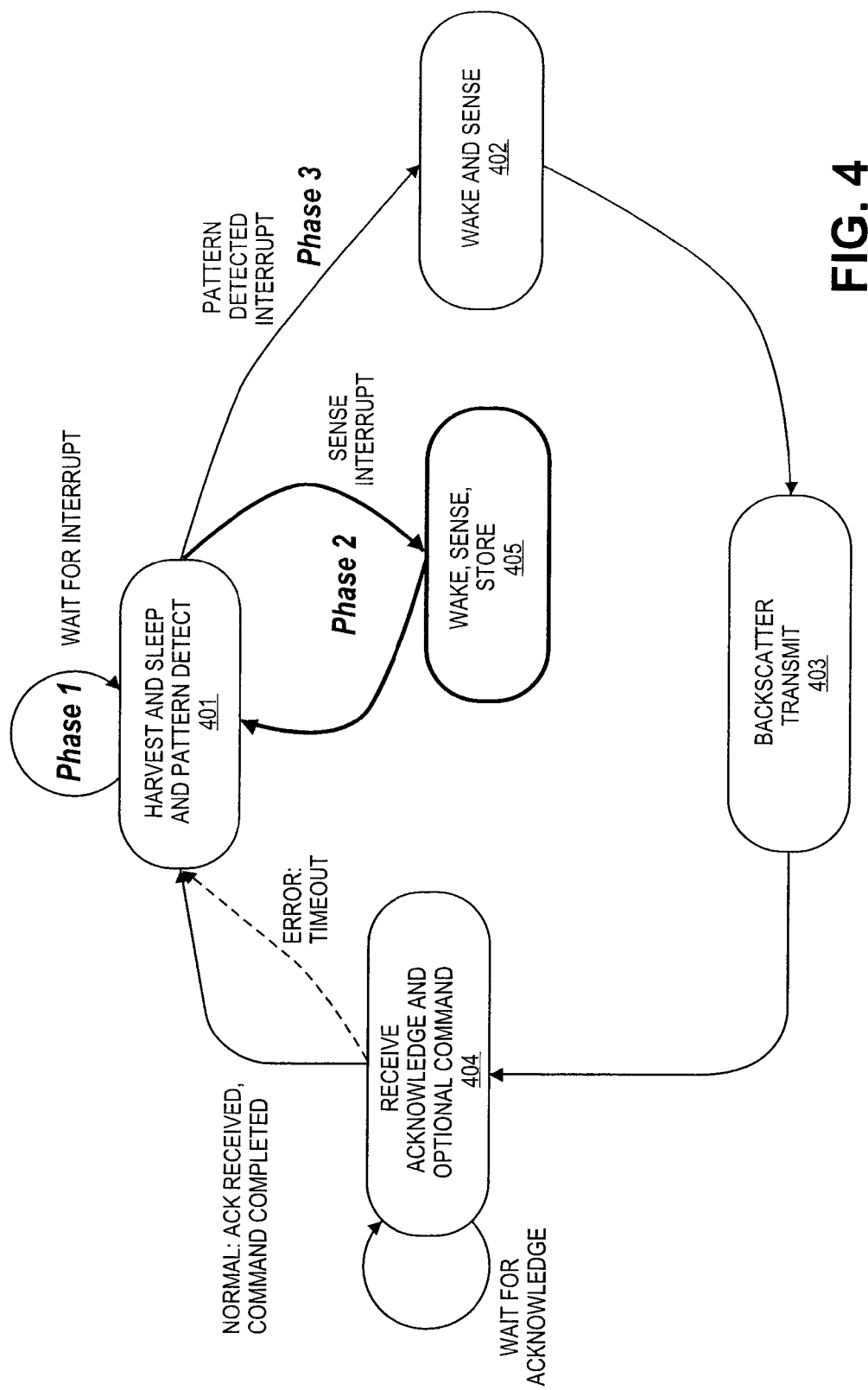
FIG. 4 is one embodiment of a backscatter tag state diagram.

FIG. 4 is one embodiment of a backscatter tag state diagram. In one embodiment, the tag state diagram illustrated in FIG. 4 represents the states of tag 300 of FIG. 3.

Referring to FIG. 4, the tag is initially in a harvest-and-sleep-and-RF pattern detection state 401. During this time, the tag loops and waits until an interrupt is detected.

In response to a sensor interrupt from one or more sensors on the tag, the tag transitions into the wake-and-sense-and-store state 405. In one embodiment, in the wake-and-sense-and-store state 405, the tag wakes up, senses the state from one or more of the tag sensors, and stores the data. Afterwards, the tag transitions to harvest-and-sleep-RF pattern detect state 401 and goes back to sleep.

While in the harvest-and-sleep-RF pattern detect state 401, in response to a different type of interrupt being detected (not a wake/sense/store interrupt, but a communicate interrupt, which may be but is not limited to a pattern detection interrupt), the tag transitions to the wake-and-sense state 402. While in the wake-and-sense state 402, the tag wakes up and performs a sensing action.

After completing the sensing operation, the tag transitions to backscatter transmit state 403 in which the tag transmits a backscatter pattern to communicate via backscatter. The sensor data is transmitted from the tag to the reader in this state. Additional data and tag status may be communicated at this time as well, as detailed in the standard communications (i.e. "Wi-Fi") embodiment described earlier. After performing the backscatter transmission, the tag transitions to receive-and-acknowledge state 404.

While in the receive-and-acknowledge state 404, the tag waits for an acknowledgement. If the acknowledgement is received, the tag transitions back into the harvest-and-sleep state 401 where the tag waits in the sleep state for an interrupt. In one embodiment, if an acknowledgement is not received within a predetermined period of time, and a timeout occurs, the tag transitions from the receive-and-acknowledge state 404 to the harvest-and-sleep state 401, and an error can be logged and reported during the next communication sequence. Alternatively, one or more messages may be backscattered, without waiting for an acknowledgement, because this may be less-expensive from an energy consumption point of view.

In one embodiment, while in the receive-and-acknowledge state 404, the tag also waits for an optional command to complete. In one embodiment, one optional command is a command that provides configuration information to the tag, which sets or changes the tags configuration upon execution. In another embodiment, one optional command is a command which, when executed, disables all or a portion of the tag. In another embodiment, the software (or firmware) on the tag may be updated via this command. In the case where the tag is waiting for an optional command while in the receive-and-acknowledge state 404, and thereafter completes the command, the tag transitions to the harvest-and-sleep state 401.

In the earlier "Wi-Fi" communication embodiment description, there is a detailed explanation of how a tag may re-configure its own operational parameters, as well as reconfiguring its own software. In this embodiment of a backscatter communication system, the tag may support the same functionality. The primary difference is that the communication is carried out via a backscatter communication network, as opposed to a standard protocol (i.e., Wi-Fi) communication network.

Figure 5A:
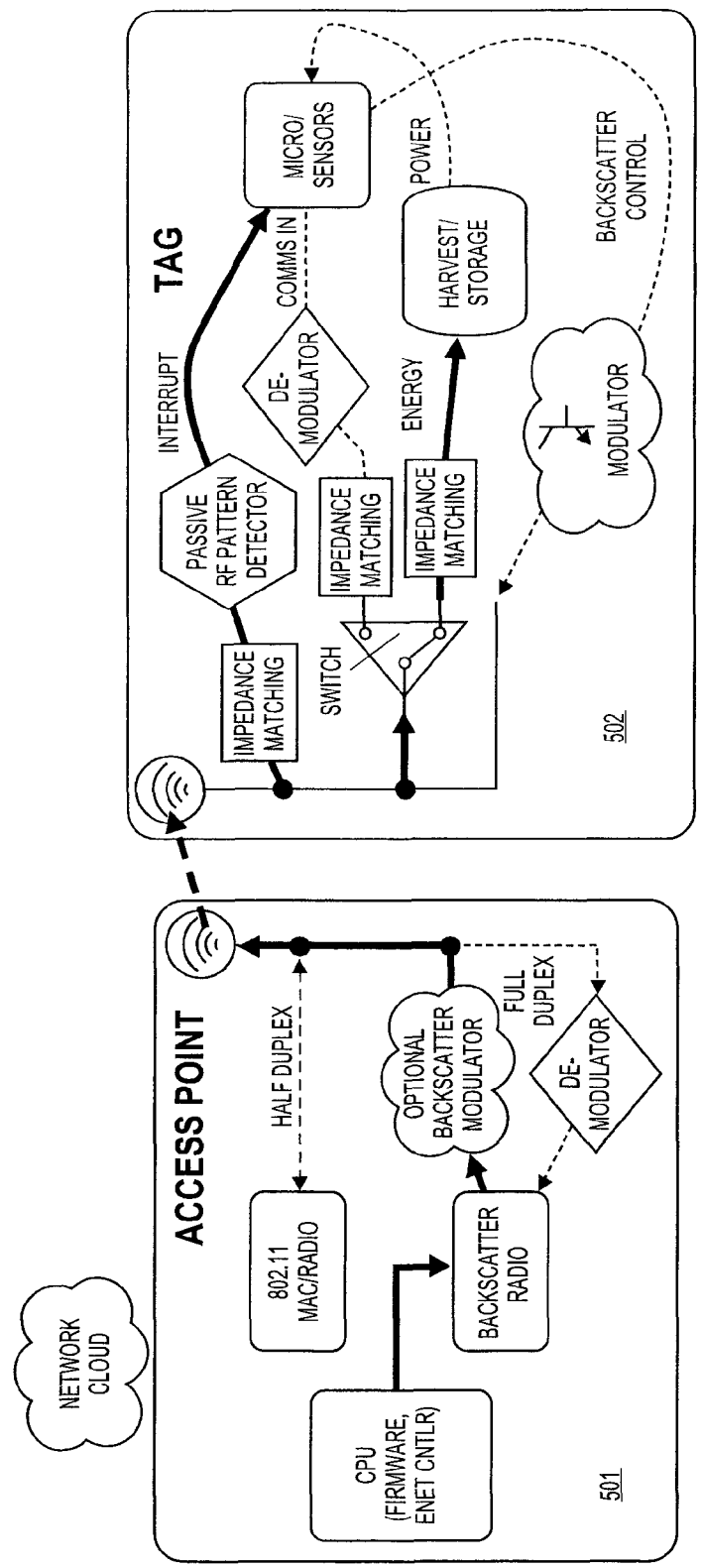
FIGS. 5A-5C illustrate a backscatter tag performing backscatter communication with an access point (AP) in a sensor network.
Figure 5B:
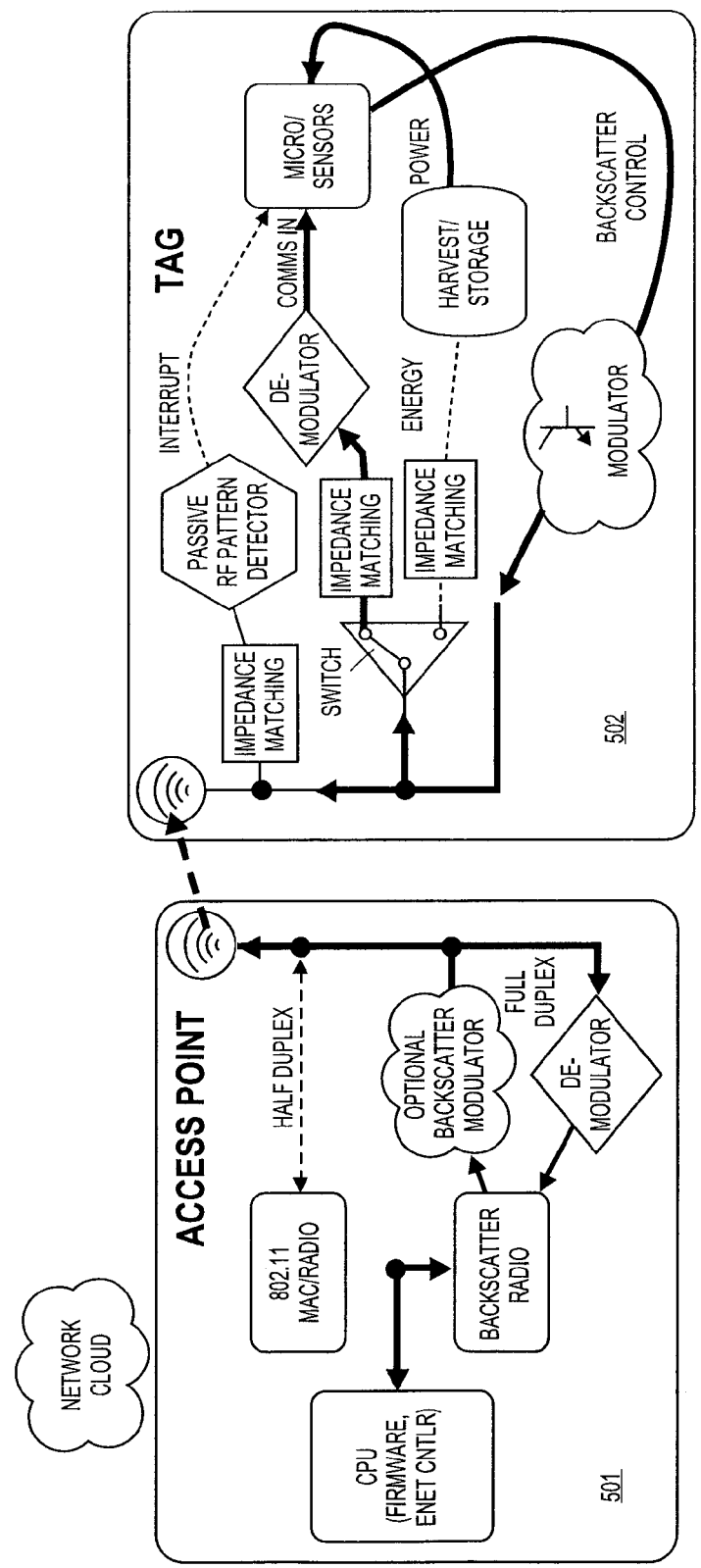
Figure 5C:
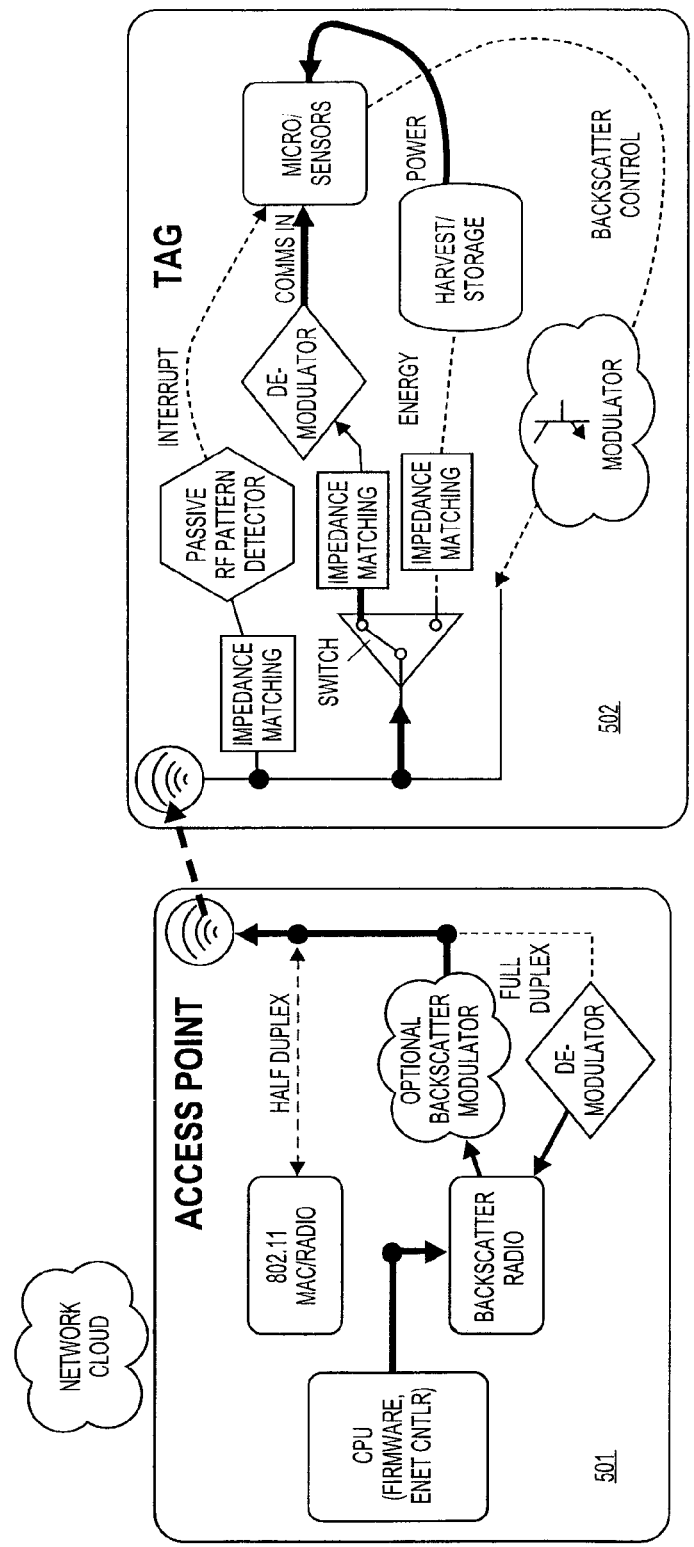

FIGS. 5A-5C illustrate the backscatter tag of FIG. 3 performing backscatter communication with an access point (AP) in a sensor network. Referring to FIG. 5A, AP 501 transmits a 'wake-up' sequence to tag 502. The passive RF pattern detector of tag 502 detects the sequence and wakes up/interrupts the tag's microcontroller. Energy is being harvested by tag 502, as is normal.

Referring to FIG. 5B, the microcontroller of tag 502 wakes on the pattern detection interrupt, switches to communications mode (no longer harvesting energy), draws power from energy storage (e.g., a battery) in tag 502, confirms the incoming wakeup sequence is directed to itself, and communicates a response via backscatter to AP 501. In one embodiment, the response is in the form of a hybrid backscatter-Internet packet that is easily converted to a format compatible with Internet communication. This allows the destination IP address for the packet to be set on the tag rather than the reader, thereby overcoming a significant limitation of many backscatter communication systems. The destination IP address (and other communication parameters such as port numbers) can be set statically at the time the tag is installed or it can be computed dynamically at run time. In one embodiment, the data computed by a tag is packaged in a User Datagram Protocol (UDP)-ready format. This is often used in networked applications that transmit limited amounts of information, such as sensor readings, that need to eliminate any requirement for prior communication to set up special transmission channels or data paths. This reduces complexity and power requirements and is well suited for the backscatter model of communication in which the physical channel can be unreliable and intermittent. A more detailed description of the hybrid backscatter-UDP packet follows soon.

Referring to FIG. 5C, AP 501 receives the response from tag 502 and sends an optional acknowledgement. In one embodiment, AP 501 also sends communications or configuration information to tag 502.

At this point, communications between AP 501 and tag 502 are complete, and tag 502 returns to its initial state (i.e., FIG. 5A) and AP 501 returns to perform its other AP functions. Before going to deep sleep, tag 502 configures itself for harvesting energy again, and passively looks for the RF pattern to wake up once again.

Figure 6:
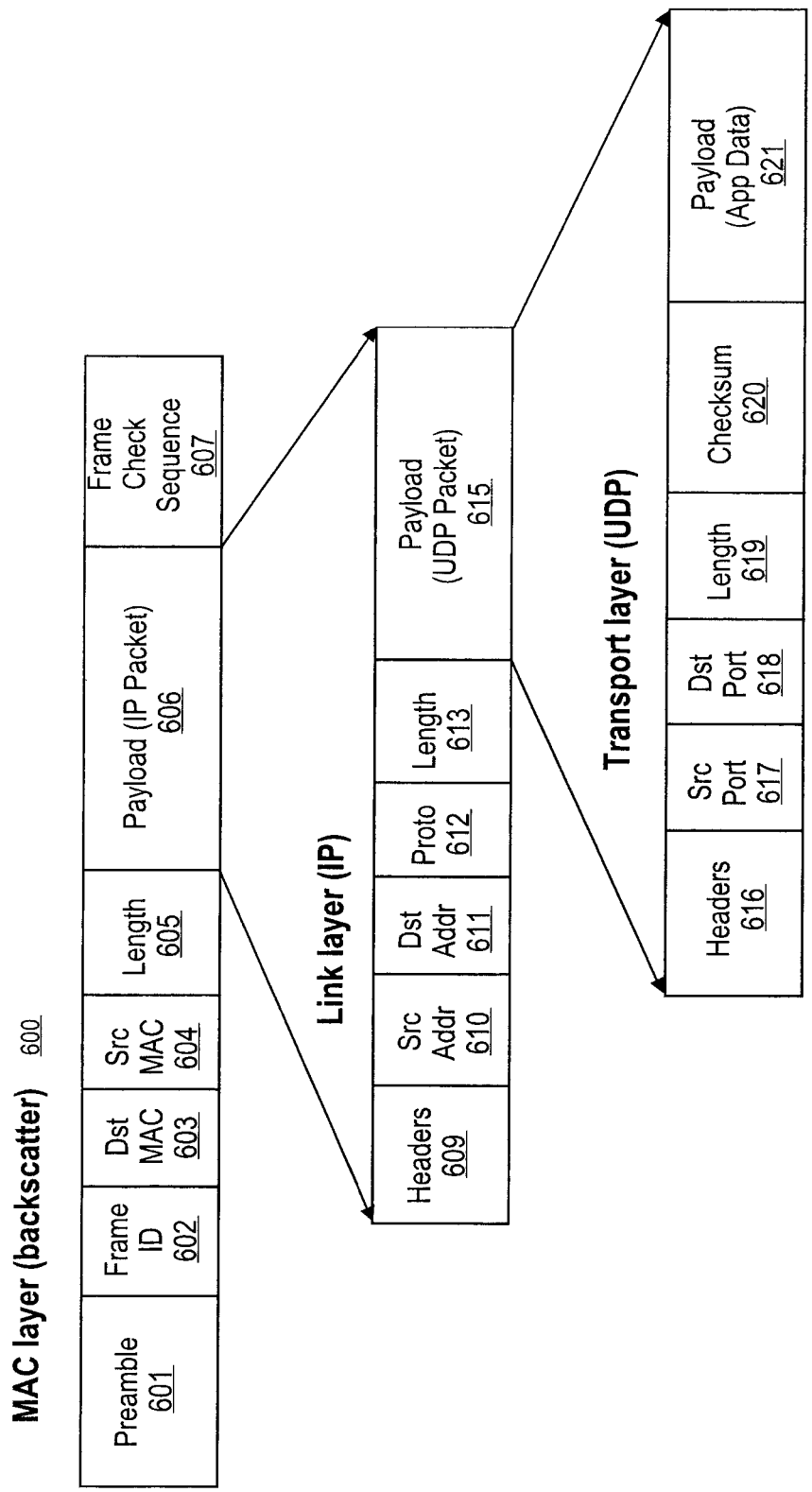
FIG. 6 illustrates an example of a backscatter-UDP packet.

FIG. 6 shows a hybrid backscatter-UDP packet. The information in a standard UDP packet (transport layer packet) includes a payload containing application data from a sensor reading. This is encapsulated in a IP packet (link-layer packet), and in turn encapsulated in a backscatter frame (a MAC-layer frame). This is conceptually similar to IEEE802.3 (Ethernet) or IEEE 802.11 (radio frame) encapsulation. Referring to FIG. 6, a backscatter frame 600 can include a preamble 601, running frame ID 602, destination MAC (MAC of the Reader) 603, source MAC (MAC of tag) 604, length 605 of payload 606, and a frame sequence check 607 (may be a checksum). The UDP packet 606 is an encapsulated IP packet. Any standard IP packet format can be used such as IPv4, IPv6, or 6LoWPAN. The IP packet 606 may include headers 609, source address of tag 610, destination address of UDP packet 611, protocol number 612 (UDP: 17, or 0x11), length 613 of payload 614, and the payload of the actual UDP packet 615. The tag IP address 610 can be an auto-assigned EUI-64-based link-local address, a self-assigned IPv4, a DHCP-assigned one, etc. The UDP packet 615 can include UDP headers 616, optional source port 617, destination port 618, length 619 of UDP payload 621, and checksum 620. The payload 621 is the actual tag data. In one embodiment, the backscatter frame 600 is further optimized by omitting or compressing known elements of the frame in a manner similar to the 6LoWPAN standard. With addresses, ports, headers, and other routing information, AP 501 can efficiently route the packet (and it provides a much easier integration to the cloud or other network arrangement). That is, the standards-compliant encapsulation of data within a UDP packet and an IP packet simplifies the computation performed by AP 501. It merely copies that data into a standard frame and transmits it as it would any other link layer frame. In this way the backscatter-UDP packet is auto-routed onto the network by AP 501.

In an alternative version of the packet format, part or all of the standard UDP and IP packet formats could be disregarded and a custom format adopted. That format would need to be understood by AP 501 since it would need to convert it to a UDP packet. In one implementation, the tag provides a destination IP address and data and AP 501 computes the rest. Alternatively, the tag provides data from which an IP address could be computed such as, for example, the ID number of a node in a network. Any packet format that contains a large amount of data, such as the hybrid UDP-backscatter packet or any alternative custom format, will have an issue with reliability of reception. As the length of the packet increases, the probability that it will be correctly received decreases. This sometimes is caused by the intermittent nature of some backscatter communication. Because of this characteristic, the communication between the tag 502 and AP 501 may be performed with a streaming protocol that splits the packet into smaller chunks that are reassembled by AP 501 before transmission on the network. For more information, see Buettner, et al., 2008, "Revisiting Smart Dust with RFID Sensor Networks," HotNets conference.

Figure 11:
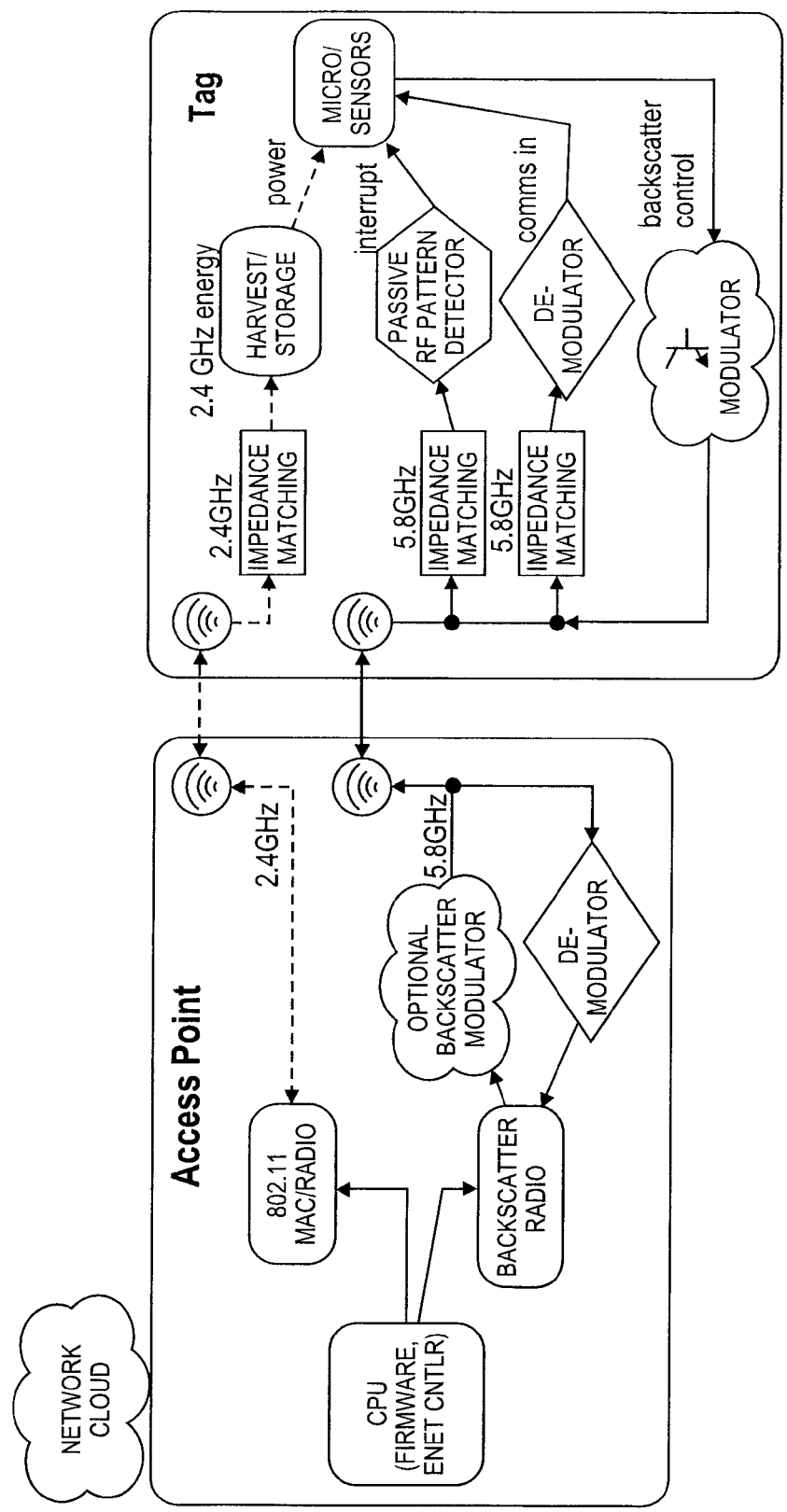
FIG. 11 illustrates a wireless communication system that harvests RF energy in the 2.4 GHz ISM band, while backscatter communications occur in the 5.8 GHz ISM band.

In one embodiment, the RF energy harvesting happens in the 2.4 GHz ISM band, while backscatter communications occur in the 5.8 GHz ISM band. FIG. 11 illustrates a wireless communication system that uses this approach. This approach has several benefits, namely:

2.4 GHz band is a more energy-abundant RF band, since it is most popular with the current generation of Wi-Fi and other RF devices;

5.8 GHz band is more suitable from communication perspective, as it is less occupied, and also allows design of more sophisticated antennas with roughly 50% reduction in linear size of antenna structure; and separation of RF energy harvesting and backscatter paths leads to reduced complexity of the antenna and matching circuits.

Referring to FIG. 11, multiple 5.8 GHz antennas can be added in the space of one 2.4 GHz antenna, to the access point, to the tag, or both. These antennas can take on the function of diversity, beamforming, and/or separate TX/RX depending on the needs. Although only a single 5.8 GHz antenna is shown, alternative embodiments may have more than one.

Also, a separate passive RF pattern detector can be placed on the tag in the 2.4 GHz signal path, to complement or to replace the one in the 5.8 GHz path in FIG. 11.

Figure 10:
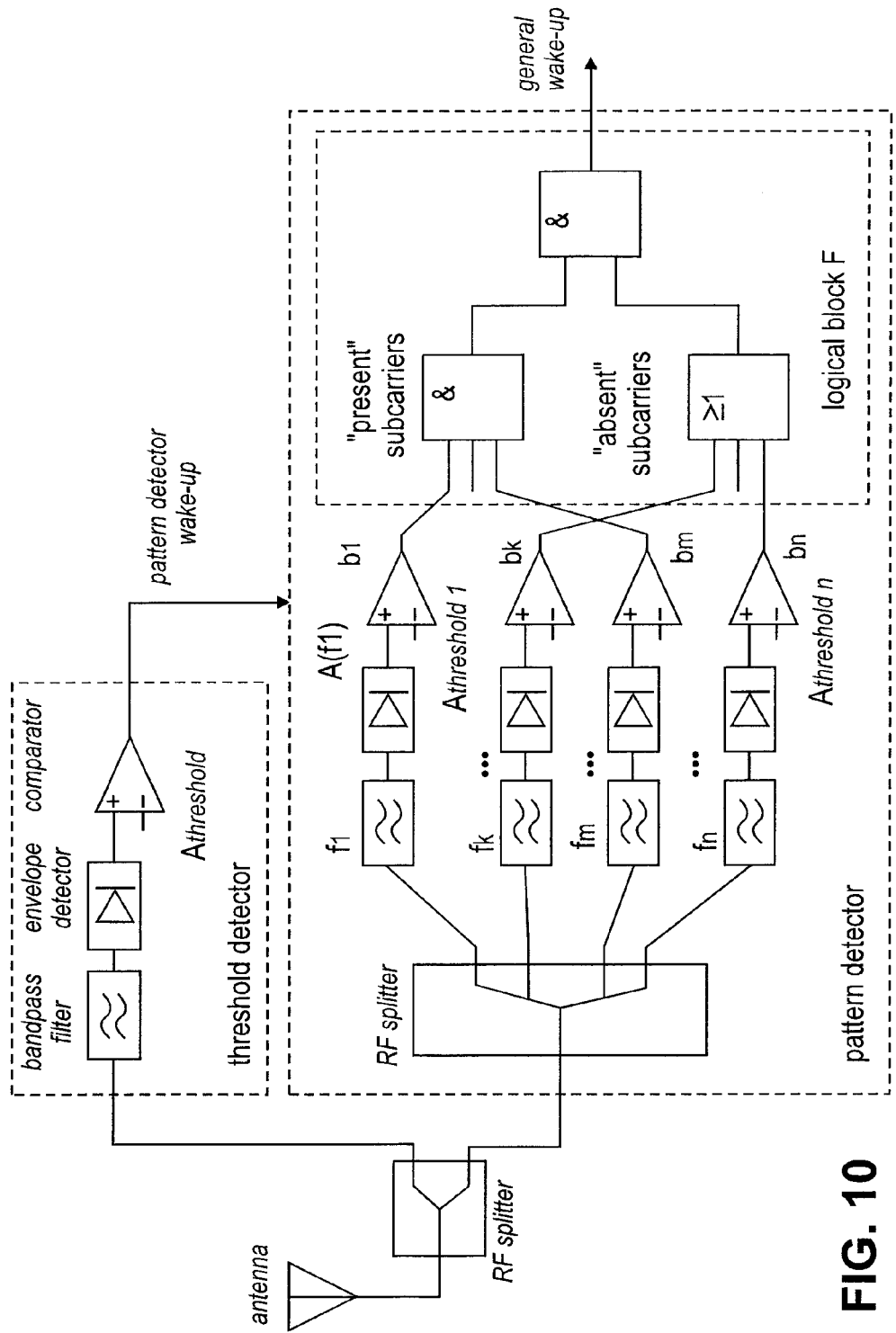
FIG. 10 illustrates a method of a nearly-zero-power RF passive pattern-detector wake-up that is frequency-domain specific (not time-domain specific).

An Alternative Frequency-Based RF Pattern Detector (Wakeup Method) for Sensor Tags In one embodiment, the passive wakeup pattern detector of the Wi-Fi or backscatter tag comprises a frequency-based wakeup detector device. In one embodiment, a sensor tag implements this frequency-based "passive RF pattern detector", as a combination of two detectors: a "threshold detector" block and a "pattern detector" (FIG. 10). The threshold detector block constantly looks at the RF power in the sub-band of interest comprised of a set of subcarrier frequencies $\{f_i\}$, and generates a pattern detector wake-up interrupt if this power exceeds a power threshold $A_{threshold}$. This threshold is set at a safe margin above the larger of the pattern detector apparatus sensitivity value, and the typical ambient RF noise level. The pattern detector wake-up interrupt wakes up the microprocessor.

In one embodiment, the pattern detector is comprised of a set of parallel narrow band-pass filters, tuned to a set of subcarrier frequencies $\{f_i\}$, with threshold detectors attached to each filter, and a Boolean function implementing a passive detection of a frequency pattern (i.e., FIG. 10):

listen on the set of subcarrier frequencies $\{f_i\}$ construct a logical Boolean vector $\{b_i\}$ for a set of Wi-Fi subcarriers i, where $$b_i = \begin{cases} 0, & A(f_i) < A_{threshold\ i} \\ 1, & A(f_i) > A_{threshold\ i} \end{cases}$$

use some Boolean function of $F(\{b_i\})=1$ for a specified time $T_{wakeup}$ as a wakeup condition for the tag core electronics Note that the power threshold $A_{threshold}$ in the threshold detector is loosely related to the set of thresholds in the pattern detector, e.g. it could be given by a formula $$A_{threshold} = \sum_{(i)} A_{threshold\ i}$$

In one embodiment, $A_{threshold\ i}$ is variable. Also, the set of frequencies $\{f_i\}$ does not have to be limited to one Wi-Fi channel, especially if it is desirable to respond to readers on different Wi-Fi channels.

FIG. 10 illustrates one embodiment of threshold and pattern detectors. The threshold and pattern detectors can be implemented in hardware, with low-power envelope detectors, comparators, and Boolean logic elements, in software running on a low-power microprocessor, with multiple taps of Fast Fourier Transform (FFT) used as outputs of subcarrier frequency filters, or as combination of hardware and software, i.e. a hardware-only threshold detector, and a software-only pattern detector. In one embodiment, in the threshold detector block, the received RF is first passed though a bandpass filter F, where the transparency window F tightly bounds the set of pattern detector frequencies $\{f_i\}$. The filtered signal is next fed into the envelope detector, and the resulting low-frequency RF envelope is fed to a comparator with reference level of $A_{threshold}$. When the RF envelope value exceeds the threshold value of $A_{threshold}$, the wakeup interrupt is generated that activates the pattern detector. In one embodiment, the pattern detector is comprised of a n-way RF splitter, feeding the RF signals to n parallel detector branches, each branch comprised of a narrow bandpass filter tuned to a subcarrier frequency $f_i$, feeding the filtered signal into an envelope detector, and next into a comparator with a threshold of $A_{threshold\ i}$. Boolean outputs of those comparators are fed into a Boolean logic block synthesizing the above-mentioned logical function F. The general wake-up interrupt is generated when the logical conditions encoded by the function F are finally met.

In one embodiment, a single frequency $f_i$, or a set of subcarriers, is used on one channel only. This approach may have certain advantages from the overall interrogator/tag system behavior.

The tag may also respond to a set of symbol combinations, e.g. depending on its state: use a "priority" symbol to send a mission-critical response earlier, respond with different measurement communicated back, or respond with an action like blink an LED.

In one embodiment, the Wi-Fi reader periodically runs a sweep of supported wake-up symbols $\{f_i\}_k$, k=1 . . . N, and runs the sweep until one of following conditions is met: a tag responds; a number of symbols is tried unsuccessfully; or the sweep set is exhausted. One feature of this method is that the "tag environment" of the reader can be continually sampled and updated for new tags that may have moved into, or out of, the read range of the access point (reader).

The sweep algorithm may pick up symbols from the set in a specific way, e.g., pick up symbols randomly, with certain weights (probabilities) assigned to symbols; goes through the symbol set sequentially; or combines the two, going through a set of preferred, or priority, symbols first, and then reverts to random draw for the rest of symbols/sweep duration.

Symbol preference may be assigned statically, dynamically, or both, to reflect: relative tag importance or acceptable communication latency (mission-critical tags); or known tag presence (keeps a dynamic table of responding tags count per symbol, with some expiration mechanism).

Wi-Fi Access Point Architecture

Figure 7:
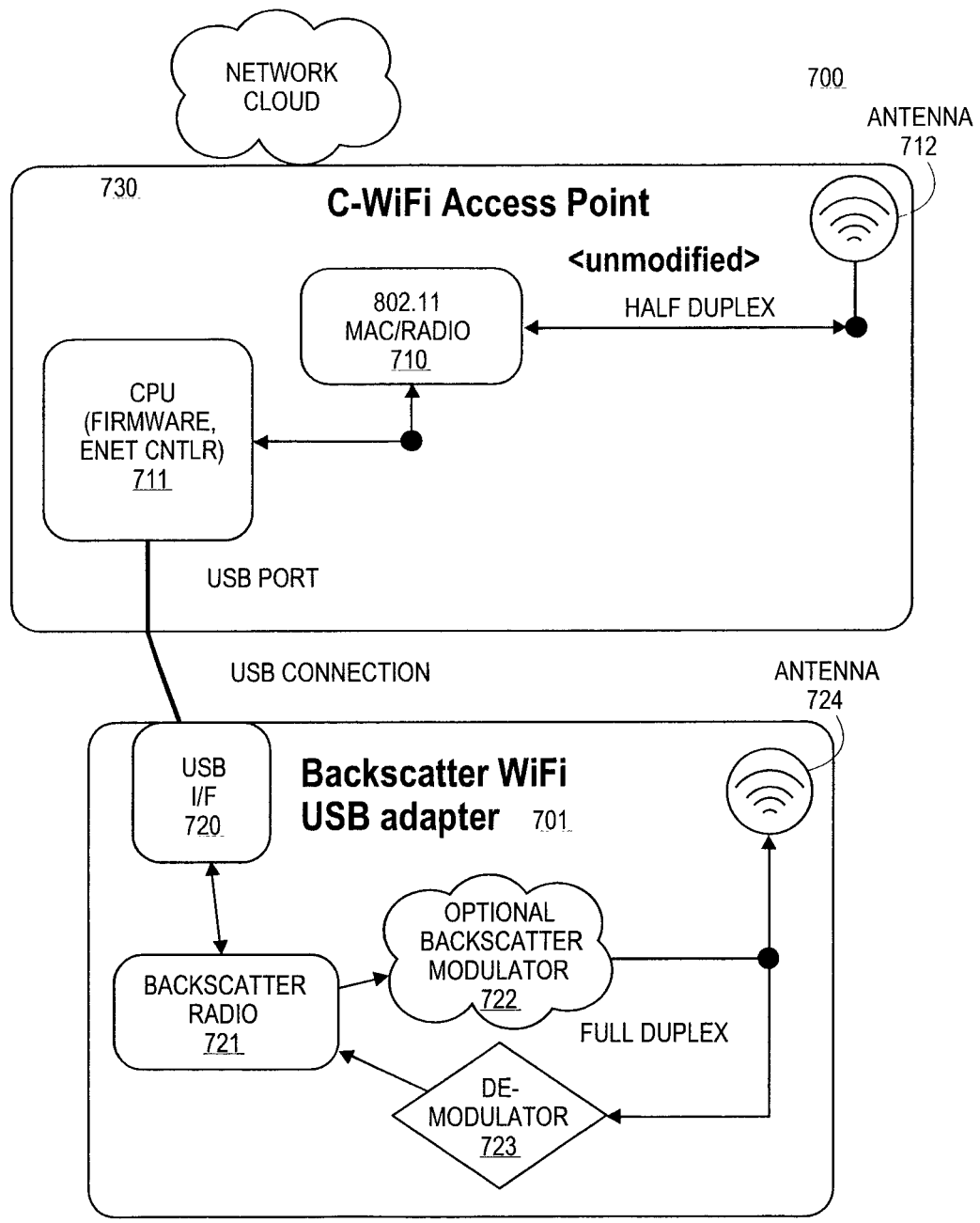
FIGS. 7-9 illustrate a number of embodiments of access point enhancements that allow an access point to communicate with a backscatter tag.
Figure 8:
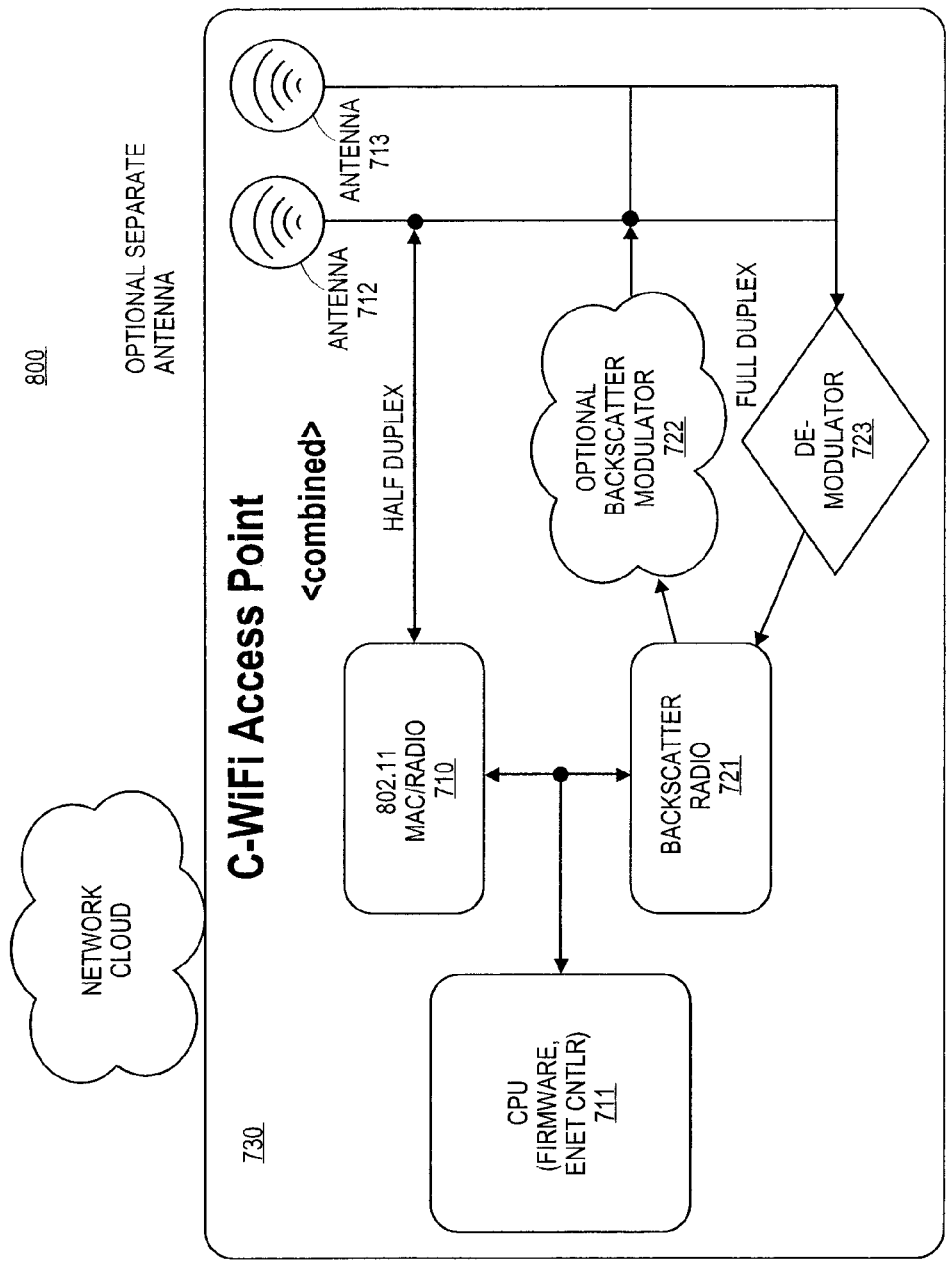
Figure 9:
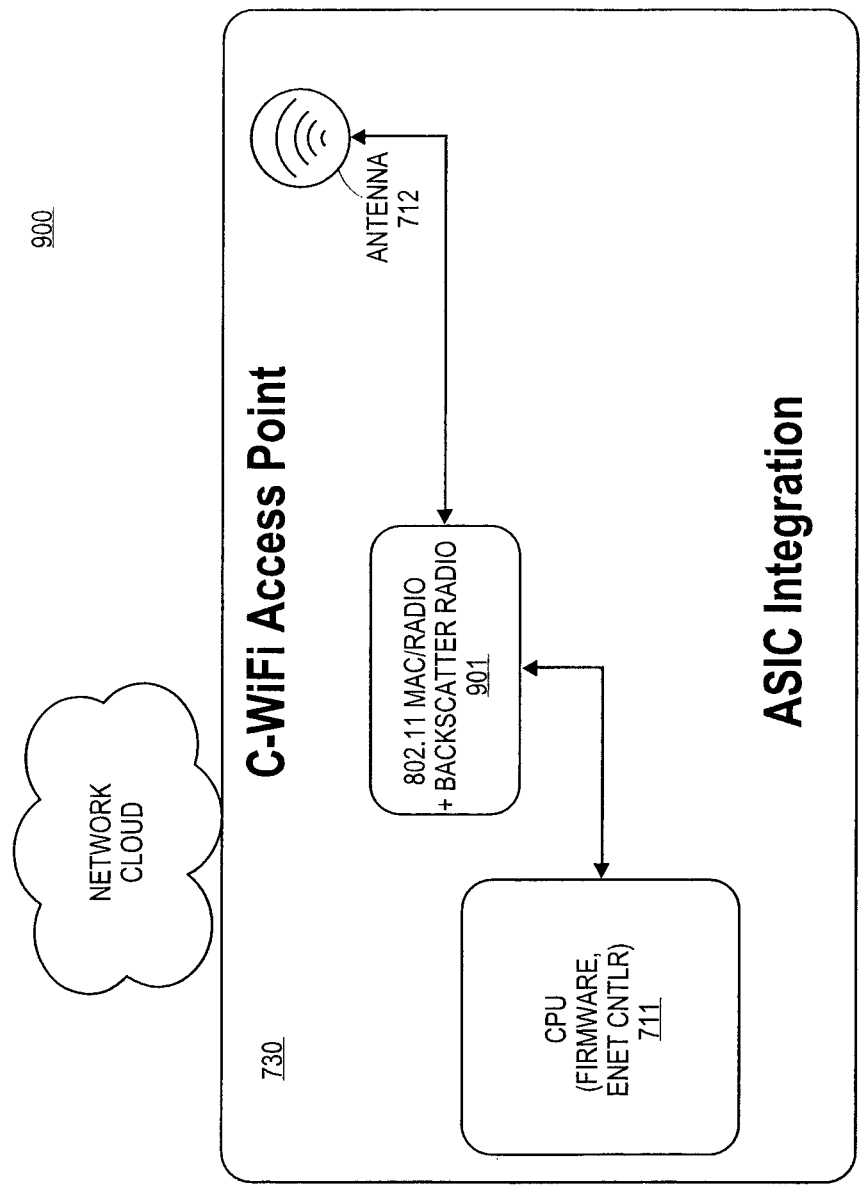

If Wi-Fi tags, such as those described in FIGS. 1 and 2, are used, there are no required changes to the access points through which they communicate to a network (e.g., the Internet). However, if backscatter communication is used, as described in FIGS. 3 and 4, access point changes will be required to facilitate the communications between a backscatter tag and the network (internet). There are a number of embodiments of access points that may be used to enable a tag communicating via backscatter to be connected to a network. These are shown in FIGS. 7-9. Referring to FIG. 7, access point (AP) 700 uses a wired connection (e.g., a USB connection or a Power-Over-Ethernet connection) between itself and a backscatter Wi-Fi USB adapter 701. AP 700 includes a CPU 711 coupled to an 802.11 radio 710. Radio 710 is coupled to antenna 712. CPU 711 interfaces with backscatter Wi-Fi USB adapter 701 via USB interface 720 (optionally a Power-Over-Ethernet or equivalent interface). USB interface 720 is coupled to backscatter radio 721, which is coupled to an optional backscatter modulator 722 and a demodulator 723. Both optional backscatter modulator 722 and a demodulator 723 are coupled to antenna 724. Optionally, the USB connection can be a power-over-ethernet, or some other wired connection. Modulator 722 is used to transmit the energy and communication data from the access point (reader) to the tag. The energy can be continuous wave energy, or it can be modulated to contain tag wake-up codes (which wake up passive RF pattern detector 321). Modulator 722 is also used to transmit acknowledge or command instructions 404. Demodulator 723 is used to receive the backscattered signal back from the tag, and demodulate the information into a data stream. This data stream contains the sensor data captured by, stored in, and transmitted (backscattered) by the tag. In this way, backscatter adapter 701 acts as a bridge between backscatter communications with a tag, and the network. Alternatively, backscatter adapter 701 may optionally have two separate antennas, one to support transmitted energy and command/acknowledge data, and one to receive the backscattered data back.

AP 700 also includes a wired connector for connecting AP 700, including CPU 711, to a network (e.g., the Internet, the cloud, etc.).

In an alternative embodiment depicted in FIG. 8, the USB adapter 701 from FIG. 7 is integrated directly into the access point. Referring to FIG. 8, AP 800 includes all the components, including CPU 711 coupled to both 802.11 radio 710 and backscatter radio 721, which is coupled to optional backscatter modulator 722 and demodulator 723. Optional backscatter modulator 722, a demodulator 723, and 802.11 radio 710 are coupled to antenna 712. In one embodiment, AP 800 includes an additional antenna, antenna 713. The number of antennas can vary with the needs and functions of Wi-Fi communication, diversity, and backscatter communication. The operation of backscatter radio 721, the optional modulator 722, and demodulator 723, are identical in FIG. 8 to their operation in FIG. 7, but embedded within the access point as opposed to a separate device outside it.

AP 800 also includes a wired connector for connecting AP 700, including CPU 711, to a network (e.g., the Internet, the cloud, etc.).

FIG. 9 illustrates an ASIC integration of backscatter communication into an AP. Referring to FIG. 9, AP 900 includes a combined 802.11 radio+backscatter radio chip 901 that is coupled to CPU 711 and antenna 712. AP 900 also includes a wired connector for connecting AP 700, including CPU 711, to a network (e.g., the Internet, the cloud, etc.). In one embodiment, the functionality of radio 721, modulator 722, and demodulator 723 are all performed by circuits designed into combined radio 901. Radio 901 is advantageous because of tighter integration of design, reducing size, cost, and power.

The process of transmitting information via backscatter communication (modulation) is well-known to those familiar with the state of the art, particularly in the field of RFID communication. The same is true for receiving information via backscatter communication (de-modulation). However, the demodulation process is different whether it's coherent or non-coherent.

FIGS. 7, 8, 9 are all constructed so that they support coherent de-modulation. The backscatter transmitter and receiver are co-located in the same device. The carrier frequency used to generate the transmitted data on the backscatter transmitter can be used as a reference frequency in the backscatter receiver, to help demodulate the received data. In this way, the signal to noise ratio is improved significantly, because it is possible to easily synchronize the received data with the transmitted data. These conditions support longer communication distances, as well as higher data bit rates (greater bandwidth).

However, in some cases, the backscatter receiver will be remote from the backscatter transmitter. For example, a transmitter may be a mobile device (a custom-designed apparatus or a mobile phone), and the receiver may be a modified access point in a fixed location. This condition is called non-coherent demodulation. The backscatter receiver is located separately from the transmitter, and therefore the receiver does not have access to the carrier frequency of the transmitted data. In this case, demodulation is still possible (the process is known to those familiar with the state of the art), but transmission distances and bandwidths may be smaller. In this case, it is also possible to pre-negotiate the carrier frequency (or include the frequency in the transmitted/received packet definition) to facilitate better synchronization at the demodulator.

Examples herein do not imply a preference of one modulation scheme over another (coherent vs. non-coherent), and this system design supports all configurations.

Finally, because of the double-path-length signal losses inherent in backscatter communication, it may be beneficial to construct bridge nodes physically located in between an Access Point (transmitting device) and a tag. These bridge nodes, being positioned closer to the tag, may be better able to receive the backscatter communication. The bridge nodes may then pass on the data to the access point via a standard wired or wireless communication interface (ethernet, Wi-Fi, Bluetooth, Zigbee, etc.). In this case, the backscatter system can be deployed with a minimum number of access points, coupled with bridge nodes reducing backscatter transmission distances, for maximum signal transmission quality and bandwidth.

The means of providing security/privacy for backscatter communication systems are well-known to those familiar with the state of the art, particularly in the field of RFID communication. The communication techniques presented herein are compatible with standard security protocols.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A communication system comprising:
an access point coupled to provide access to a network;
a radio-frequency (RF) tag communicatively coupled to the access point, the RF tag comprising
an energy harvesting unit operable to convert incident RF energy to direct current (DC);
a storage unit operable to store recovered DC power;
a passive wakeup pattern detector operable to generate an interrupt in response to detecting a set of one or more subcarriers;
one or more sensors for sensing;
a communication mechanism; and
a microcontroller coupled to the energy harvesting and storage units, and the one or more sensors, the microcontroller operable to wake up from a sleep state in response to the interrupt and cause the communication mechanism to exchange data wirelessly with a device while powered by energy previously harvested and stored by the energy harvesting and storage unit;
an antenna;
a first impedance matching circuit directly connecting the antenna to the passive wakeup pattern detector;
a switch connected to the antenna;
a second impedance matching circuit, separate from the first impedance matching circuit, on an output of the switch; and
a demodulator coupled to the switch via the second impedance matching circuit.

2. The communication system defined in claim 1 wherein the passive wakeup pattern detector comprises a frequency-based wakeup detector.

3. The communication system defined in claim 2 wherein the frequency-based wakeup detector comprises:
a threshold detector; and
a pattern detector coupled to the threshold detector.

4. The communication system defined in claim 3 wherein the threshold detector looks at RF power in a sub-band of subcarrier frequencies and generates a wake-up interrupt to wake up the microcontroller if the RF power exceeds a power threshold.

5. The communication system defined in claim 3 wherein the pattern detector comprises:
a set of narrow band-pass filters tuned to a set of subcarrier frequencies; and
a plurality of threshold detectors, each threshold detector being coupled to a distinct one of the band-pass filters.

6. The communication system defined in claim 5 wherein the pattern detector further comprises a Boolean function, and wherein the pattern detector is operable to listen on the set of subcarrier frequencies, construct a logical Boolean vector for the set of subcarriers based on a relationship between a subcarrier and a power threshold, and use the Boolean function for a specified time as a wakeup condition.

7. The communication system defined in claim 3 wherein the threshold detector comprises:
a band-pass filter having an output, the filter operable to filter a received RF signal to obtain a filtered RF signal with a set of subcarrier frequencies, the filtered RF signal being output on the output of the band-pass filter;
an envelope detector having an input coupled to the output of the band-pass filter and being operable to output an RF envelope of the filtered RF signal; and
a comparator having first and second inputs and an output, wherein the first input is coupled an output of the envelope detector and the second input coupled to a power threshold, the comparator is operable to output a pattern detector wake-up signal to wake up the pattern detector when the RF envelope exceeds the power threshold.

8. The communication system defined in claim 3 wherein the pattern detector comprises:
a n-way RF splitter operable to feed RF signals;
n parallel detector branches coupled to receive the RF signals fed from the n-way RF splitter, wherein each branch of the n parallel detector branches including
a band-pass filter tuned to a subcarrier frequency to generate a filtered signal,
an envelope detector coupled to receive the filtered signal and generate an RF envelope, and
a comparator to compare the RF envelope to a power threshold and generate a comparator output;
a Boolean logic block to receive comparator outputs from each branch of the n parallel detector branches and generate a wake-up interrupt based on the comparator outputs.

9. The communication system defined in claim 1 wherein the communication mechanism comprises a radio.

10. The communication system defined in claim 1 wherein the communication mechanism comprises a backscatter communicator.

11. The communication system defined in claim 1 wherein the demodulator is coupled to the second impedance matching circuit and the microcontroller without connecting to the passive wakeup pattern detector.

12. The communication system defined in claim 1 further comprising:
a third impedance matching circuit, separate from the first impedance matching circuit and the second impedance matching circuit, the third impedance matching circuit being coupled to the energy harvesting unit,
wherein the switch switches between the second impedance matching circuit and the third impedance matching circuit.

13. A method for communicating information wirelessly between an access point and a radio frequency (RF) tag having a passive wakeup pattern detector directly connected to an antenna via a first impedance matching circuit, the method comprising:
monitoring, by the RF tag, radio frequency (RF) communications with the RF tag while converting incident RF energy to direct current using an energy harvesting unit of the RF tag;
sending, by the access point, a first RF communication to the RF tag;
detecting one or more subcarriers in the RF communications using the passive wakeup pattern detector in the RF tag;
generating an interrupt to a microcontroller in the RF tag in response to detecting the one or more subcarriers;
waking up the microcontroller in response to the interrupt to cause a communication mechanism of the RF tag to exchange data wirelessly with a device, the RF tag powered by powered by energy previously harvested and stored by the energy harvesting and storage unit;
demodulating, by a demodulator, the RF communications and providing the demodulated RF communications to the microcontroller when the RF tag is not harvesting energy and when a switch, which is coupled to the antenna and coupled to the demodulator via a second impedance matching circuit separate from the first impedance matching circuit, provides the RF communications to the demodulator from the antenna; and
communicating information between the RF tag and the access point.

14. The method defined in claim 13 wherein detecting one or more subcarriers in the RF communications using a passive wakeup pattern detector in the RF tag is performed using a frequency-based wakeup detector.

15. The method defined in claim 14 wherein the frequency-based wakeup detector comprises:
a threshold detector; and
a pattern detector coupled to the threshold detector.

16. The method defined in claim 15 further comprising the threshold detector looking at RF power in a sub-band of subcarrier frequencies and generating a wake-up interrupt to wake up the microcontroller if the RF power exceeds a power threshold.

17. The method defined in claim 15 further comprising:
filtering the RF communications using a set of narrow band-pass filters tuned to a set of subcarrier frequencies; and
using a plurality of threshold detectors to performing threshold detection on outputs of the band-pass filters.

18. The method defined in claim 17 wherein the pattern detector further comprises a Boolean function, and further comprising listening on the set of subcarrier frequencies, constructing a logical Boolean vector for the set of subcarriers based on a relationship between a subcarrier and a power threshold, and using the Boolean function for a specified time as a wakeup condition.

19. The method defined in claim 15 further comprising:
filtering a received RF signal using a band-pass filter having an output to obtain a filtered RF signal with a set of subcarrier frequencies, including outputting the filtered RF signal on the output of the band-pass filter;
performing envelope detection using an envelope detector, having an input coupled to the output of the band-pass filter, to output an RF envelope of the filtered RF signal; and
comparing the RF envelope to a power threshold using a comparator having first and second inputs and an output and outputting a pattern detector wake-up signal to wake up the pattern detector when the RF envelope exceeds the power threshold.

20. The method defined in claim 15 further comprising:
generating a plurality of RF signals using a n-way RF splitter;
for each of the plurality of RF signals,
filtering each RF signal using a band-pass filter tuned to a subcarrier frequency to generate a filtered signal,
performing envelope detection to generate an RF envelope using an envelope detector coupled to receive the filtered signal, and
comparing the RF envelope to a power threshold to generate a comparator output; and
generating a wake-up interrupt based on received comparator outputs.

* * * * *